(12) United States Patent
Hwang et al.

(10) Patent No.: US 12,143,560 B2
(45) Date of Patent: *Nov. 12, 2024

(54) DEVICE AND METHOD TO CALIBRATE PARALLAX OPTICAL ELEMENT

(71) Applicant: SAMSUNG ELECTRONICS CO., LTD., Suwon-si (KR)

(72) Inventors: Chansol Hwang, Suwon-si (KR); Byong Min Kang, Yongin-si (KR); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,611

(22) Filed: Aug. 29, 2023

(65) Prior Publication Data

US 2023/0403388 A1 Dec. 14, 2023

Related U.S. Application Data

(63) Continuation of application No. 17/672,935, filed on Feb. 16, 2022, now Pat. No. 11,778,163.

(30) Foreign Application Priority Data

Jul. 29, 2021 (KR) ........................ 10-2021-0099801

(51) Int. Cl.
*H04N 13/327* (2018.01)
*G06F 3/04847* (2022.01)
(Continued)

(52) U.S. Cl.
CPC ....... *H04N 13/327* (2018.05); *G06F 3/04847* (2013.01); *H04N 13/111* (2018.05); *H04N 13/317* (2018.05); *H04N 13/125* (2018.05)

(58) Field of Classification Search
CPC .. H04N 13/111; H04N 13/125; H04N 13/305; H04N 13/31; H04N 13/317; H04N 13/327
(Continued)

(56) References Cited

U.S. PATENT DOCUMENTS 8,520,060 B2  8/2013  Zomet et al.
9,019,354 B2  4/2015  Grossmann
(Continued)

FOREIGN PATENT DOCUMENTS

CN     112130325 A   12/2020
EP       2597879 A2    5/2013
(Continued)

OTHER PUBLICATIONS

Communication issued Sep. 12, 2022 by the European Patent Office for European Application No. 22163843.0.

*Primary Examiner* — Behrooz M Senfi
(74) *Attorney, Agent, or Firm* — Sughrue Mion, PLLC

(57) ABSTRACT

Provided is an electronic device including a display to output an image, a parallax optical element configured to provide light corresponding to the image to a plurality of viewpoints, an input interface configured to receive an input to calibrate the parallax optical element by a user who observes a pattern image from a reference viewpoint among the plurality of viewpoints, and a processor configured to output the pattern image generated by rendering a calibration pattern toward the reference viewpoint, adjust at least one of a pitch parameter, a slanted angle parameter, and a position offset parameter of the parallax optical element based on the input, and output, by the display, the pattern image adjusted by re-rendering the calibration pattern based on an adjusted parameter.

19 Claims, 14 Drawing Sheets

(51) Int. Cl.
  *H04N 13/111* (2018.01)
  *H04N 13/317* (2018.01)
  *H04N 13/125* (2018.01)

(58) Field of Classification Search
  USPC .......................................................... 348/54
  See application file for complete search history.

(56) References Cited

U.S. PATENT DOCUMENTS

| | | |
|---|---|---|
| 10,721,462 B2 | 7/2020 | Park et al. |
| 11,778,163 B2 * | 10/2023 | Hwang ................. H04N 13/111 348/54 |
| 11,882,266 B2 * | 1/2024 | Hwang ................. G02B 30/28 |
| 2005/0073530 A1 | 4/2005 | Kapur et al. |
| 2009/0005961 A1 * | 1/2009 | Grabowski ............ G02B 27/01 701/532 |
| 2014/0118511 A1 * | 5/2014 | Hyde ................... H04N 13/366 348/54 |
| 2017/0171532 A1 * | 6/2017 | Hyde ................... H04N 13/383 |
| 2019/0373249 A1 | 12/2019 | Kato |
| 2019/0394451 A1 | 12/2019 | Shin |
| 2020/0174267 A1 | 6/2020 | Jung et al. |

FOREIGN PATENT DOCUMENTS

| | | |
|---|---|---|
| EP | 3477945 A1 | 5/2019 |
| JP | 2012053268 A | 3/2012 |
| JP | 2020024340 A | 2/2020 |
| KR | 101956532 B1 | 3/2019 |
| KR | 102208898 B1 | 1/2021 |

\* cited by examiner

DEVICE AND METHOD TO CALIBRATE PARALLAX OPTICAL ELEMENT

CROSS-REFERENCE TO RELATED APPLICATION

This application is a Continuation Application of U.S. patent application Ser. No. 17/672,935, filed Feb. 16, 2022, which claims priority to Korean Patent Application No. 10-2021-0099801, filed on Jul. 29, 2021, in the Korean Intellectual Property Office, the disclosure of which is incorporated herein by reference in its entirety.

BACKGROUND

1. Field

Example embodiments of the present disclosure relate to methods and apparatuses directed to calibration of a parallax optical element.

2. Description of Related Art

The most dominant factor among factors for recognizing a stereoscopic image is a difference between images viewed by both eyes of a user. A scheme of presenting different images to both eyes of a user may include a stereoscopic scheme of filtering images using, for example, polarization-based division, time division, or wavelength division of varying a wavelength of a primary color, and an autostereoscopic scheme of presenting each image to be viewed from a predetermined viewpoint using a three-dimensional (3D) conversion device, such as, for example, a parallax barrier, a lenticular lens, or a directional backlight unit.

Using the autostereoscopic scheme, the inconvenience of wearing glasses may be reduced. In the autostereoscopic scheme, a 3D image may be accurately projected toward both eyes of a user to prevent crosstalk of the 3D image. However, an image quality may be degraded when an error different from a design value occurs in a production process or an installation process of a 3D display device and a 3D conversion device.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an electronic device including a display to output an image, a parallax optical element configured to provide light corresponding to the image to a plurality of viewpoints, an input interface configured to receive an input to calibrate the parallax optical element by a user who observes a pattern image from a reference viewpoint among the plurality of viewpoints, and a processor configured to output the pattern image generated by rendering a calibration pattern toward the reference viewpoint, adjust at least one of a pitch parameter, a slanted angle parameter, and a position offset parameter of the parallax optical element based on the input, and output, by the display, the pattern image adjusted by re-rendering the calibration pattern based on an adjusted parameter.

The processor may be further configured to rotate a pattern corresponding to a first pattern image in a counterclockwise direction from a direction in which the user observes the pattern, based on an increase in a value of the pitch parameter among parameters of the parallax optical element based on the input, and rotate the pattern corresponding to the first pattern image in a clockwise direction from the direction in which the user observes the pattern, based on a decrease in the value of the pitch parameter among the parameters of the parallax optical element based on the input.

The processor may be further configured to rotate a pattern corresponding to a second pattern image in a clockwise direction from a direction in which the user observes the pattern, based on an increase in a value of the slanted angle parameter among parameters of the parallax optical element based on the input, and rotate the pattern corresponding to the second pattern image in a counterclockwise direction from the direction in which the user observes the pattern, based on a decrease in the value of the slanted angle parameter among the parameters of the parallax optical element based on the input.

The processor may be further configured to move a pattern corresponding to a third pattern image in one direction from a direction in which the user observes the pattern, based on an increase in a value of the position offset parameter among parameters of the parallax optical element based on the input, and move the pattern corresponding to the third pattern image in an opposite direction to the one direction from the direction in which the user observes the pattern, based on a decrease in the value of the position offset parameter among the parameters of the parallax optical element based on the input.

The input interface may include at least one of a touch panel, a touch screen, a dial, a jog dial, a shuttle dial, a click wheel, a button, a slider bar, and a control lever.

The processor may be further configured to map adjustment of at least one of the pitch parameter and the slanted angle parameter to an input device configured to detect a rotation control in the input interface, and map adjustment of the position offset parameter to the input device further configured to detect a linear control in the input interface.

The input interface may be configured to detect a rotation control input by the user, and the processor may be further configured to adjust at least one of the pitch parameter and the slanted angle parameter among parameters of the parallax optical element, based on the rotation control input by the user being detected by the input interface during calibration of the parallax optical element.

The processor may be further configured to rotate a first calibration pattern corresponding to a first pattern image corresponding to the pitch parameter in a counterclockwise direction, based on a counterclockwise rotation control being detected by the input interface while the first pattern image is being provided, and rotate the first calibration pattern corresponding to the first pattern image in a clockwise direction, based on a clockwise rotation control being detected by the input interface while the first pattern image is being provided.

The processor may be further configured to increase a value of the pitch parameter, based on the counterclockwise rotation control being detected by the input interface while the first pattern image is being provided, and reduce the value of the pitch parameter, based on the clockwise rotation control being detected by the input interface while the first pattern image is being provided.

The processor may be further configured to rotate a second calibration pattern corresponding to a second pattern image corresponding to the slanted angle parameter in a clockwise direction, based on a clockwise rotation control being detected by the input interface while the second pattern image is being provided, and rotate the second calibration pattern corresponding to the second pattern image in a counterclockwise direction, based on a counterclockwise rotation control being detected by the input interface while the second pattern image is being provided.

The processor may be further configured to increase a value of the slanted angle parameter, based on the clockwise rotation control being detected by the input interface while the second pattern image is being provided, and reduce the value of the slanted angle parameter, based on the counterclockwise rotation control being detected by the input interface while the second pattern image is being provided.

The processor may be further configured to move a third calibration pattern corresponding to a third pattern image corresponding to the position offset parameter in a first direction, based on a linear control in the first direction being detected by the input interface while the third pattern image is being provided, and move the third calibration pattern corresponding to the third pattern image in a second direction that is opposite to the first direction, based on a linear control in the second direction to the first direction being detected by the input interface while the third pattern image is being provided.

The processor may be further configured to increase a value of the position offset parameter, based on a linear control in a first direction being detected by the input interface while a third pattern image corresponding to the position offset parameter is being provided, and reduce the value of the position offset parameter based on a linear control in a second direction opposite to the first direction being detected by the input interface while the third pattern image is being provided.

The input interface may include a touch screen, and the processor may be further configured to output, to the touch screen, a first graphic representation configured to guide a rotation control during calibration of at least one of the pitch parameter and the slanted angle parameter, adjust at least one of the pitch parameter and the slanted angle parameter, based on a movement of a touch point along at least partially circular trajectory from a point on the touch screen being detected corresponding to the first graphic representation, output, to the touch screen, a second graphic representation configured to guide a linear control during calibration of the position offset parameter, and adjust the position offset parameter, based on a linear movement of a touch point from one point on the touch screen to another point being detected corresponding to the second graphic representation.

The processor may be further configured to store parameters of the parallax optical element that are personalized to the user, based on a calibration completion input being received from the user, and render a content image based on the personalized parameters and output the content image to the display.

The processor may be further configured to provide the user with at least one of a first pattern image corresponding to the pitch parameter, a second pattern image corresponding to the slanted angle parameter, and a third pattern image corresponding to the position offset parameter.

The processor may be further configured to provide the second pattern image to the user, based on adjustment of the pitch parameter by providing the first pattern image being completed, and provide the third pattern image to the user, based on adjustment of the slanted angle parameter by providing the second pattern image being completed.

The display may be included in a head-up display (HUD) mounted on a vehicle, wherein the vehicle is one of a motorcycle, an automobile, a train, a watercraft, an aircraft, and a spacecraft.

According to another aspect of an example embodiment, there is provided a method implemented by a processor, the method including providing light corresponding to a pattern image to a reference viewpoint through a parallax optical element, the pattern image being generated by rendering a calibration pattern and output from a display, receiving an input to calibrate parameters of the parallax optical element by a user who observes the pattern image from the reference viewpoint, adjusting at least one of a pitch parameter, a slanted angle parameter, and a position offset parameter of the parallax optical element, based on the input, and outputting the pattern image adjusted by re-rendering the calibration pattern based on an adjusted parameter, by the display.

A non-transitory computer-readable storage medium storing instructions that, when executed by the processor, may cause the processor to perform the method.

According to another aspect of an example embodiment, there is provided an electronic device including a head-up display (HUD) configured to output an image, a parallax optical element configured to provide light corresponding to the image to a plurality of viewpoints, an input interface configured to receive an input to calibrate the parallax optical element by a user who observes a pattern image from a reference viewpoint among the plurality of viewpoints, and a processor configured to output the pattern image generated by rendering a calibration pattern toward the reference viewpoint, adjust at least one of a pitch parameter, a slanted angle parameter, and a position offset parameter of the parallax optical element based on the input, and output, by the HUD, the pattern image adjusted by re-rendering the calibration pattern based on an adjusted parameter, wherein the input interface includes at least one of a touch panel, a touch screen, a dial, a jog dial, a shuttle dial, a click wheel, a button, a slider bar, and a control lever.

BRIEF DESCRIPTION OF THE DRAWINGS

The above and/or other aspects will be more apparent by describing example embodiments, taken in conjunction with the accompanying drawings, in which.

DETAILED DESCRIPTION

Figure 1:
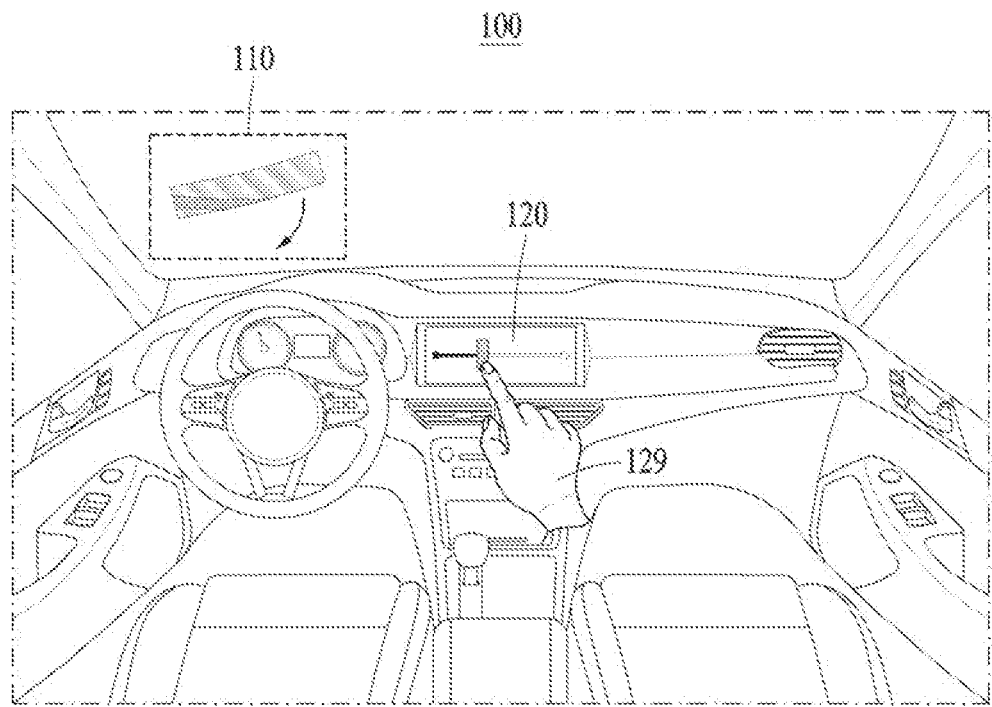
FIG. 1 illustrates an electronic device that performs calibration of a parallax optical element according to an example embodiment.

The following detailed structural or functional description of example embodiments is provided as an example only and various alterations and modifications may be made to the example embodiments. Here, the example embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like constituent elements and a repeated description related thereto will be omitted.

FIG. 1 illustrates an electronic device that performs calibration of a parallax optical element according to an example embodiment.

An electronic device 100 according to an example embodiment may provide a stereoscopic image to a user. For example, the electronic device 100 may provide images having binocular disparity to both eyes of a user. Images having binocular disparity may include, for example, a first image provided to a left eye of a user and a second image provided to a right eye of the user. Pixels corresponding to the same object and/or the same point in the first image and the second image may be spaced apart by a disparity according to a depth (e.g., a distance to a corresponding object defined and/or set to be recognized by a user) of a corresponding object and/or a corresponding point. However, for convenience of description, an example in which a stereoscopic image is provided to a left eye and a right eye of a user at a first viewpoint and a second viewpoint that respectively correspond to the left eye and the right eye of the user is described above, however, the example embodiments are not limited thereto. Depending on example embodiments, images may be designed to be provided to two or more viewpoints, or a stereoscopic image may be designed to be provided to two or more users. For example, the electronic device 100 may provide an image pair having binocular disparity for each pixel to a first viewpoint corresponding to a left eye of a first user and a second viewpoint corresponding to a right eye of the first user. In addition, the electronic device 100 may provide an image pair having binocular disparity for each pixel to a third viewpoint corresponding to a left eye of a second user and a fourth viewpoint corresponding to a right eye of the second user.

The electronic device 100 may output an image through a display panel, and a parallax optical element of the electronic device 100 may be configured to direct light corresponding to the output image to a plurality of viewpoints. Due to an error and/or tolerance in a manufacturing process, a portion of an image that needs to be provided to a left eye and/or a right eye of a user may be observed by the opposite eye, if fine tuning through calibration is not performed. Such a phenomenon in which an image that needs to be observed from one viewpoint is observed from another viewpoint may be referred to as crosstalk. A left eye image may need to be observed from a viewpoint corresponding to a left eye of a user and a right eye image may need to be observed from a viewpoint corresponding to a right eye of the user, so that the user may accurately recognize a sense of depth and may view a clear image.

The electronic device 100 may perform calibration to reduce and/or eliminate the above-described crosstalk. The electronic device 100 may provide a user with a calibration pattern 110 corresponding to a pattern image for calibration. The electronic device 100 may receive an input 129 for calibration from a user who observes the calibration pattern 110 corresponding to the pattern image. When the input 129 for calibration is received, the electronic device 100 may adjust a parameter of the parallax optical element to correspond to the input 129. The electronic device 100 may change the calibration pattern 110 corresponding to the pattern image according to the adjusted parameter. The user may repeatedly provide an input to control the calibration until the calibration pattern 110 corresponding to the pattern image is aligned with a reference line (e.g., a vertical line and/or a horizontal line). The electronic device 100 may provide a convenient input interface 120 for manipulation for calibration. For example, in FIG. 1, when a touch screen of the electronic device 100 displays a slider bar and when the electronic device 100 detects the input 129 (e.g., an input to horizontally move a slider bar object) on the slider bar, the parameter of the parallax optical element may be adjusted.

For example, as shown in FIG. 1, the electronic device 100 may be mounted on a vehicle may provide a content image and/or a pattern image to a user by projecting the content image and/or the pattern image through a windshield of the vehicle. However, embodiments are not limited thereto. A head-up display (HUD) using a windshield will be described below with reference to FIG. 2.

Figure 2:
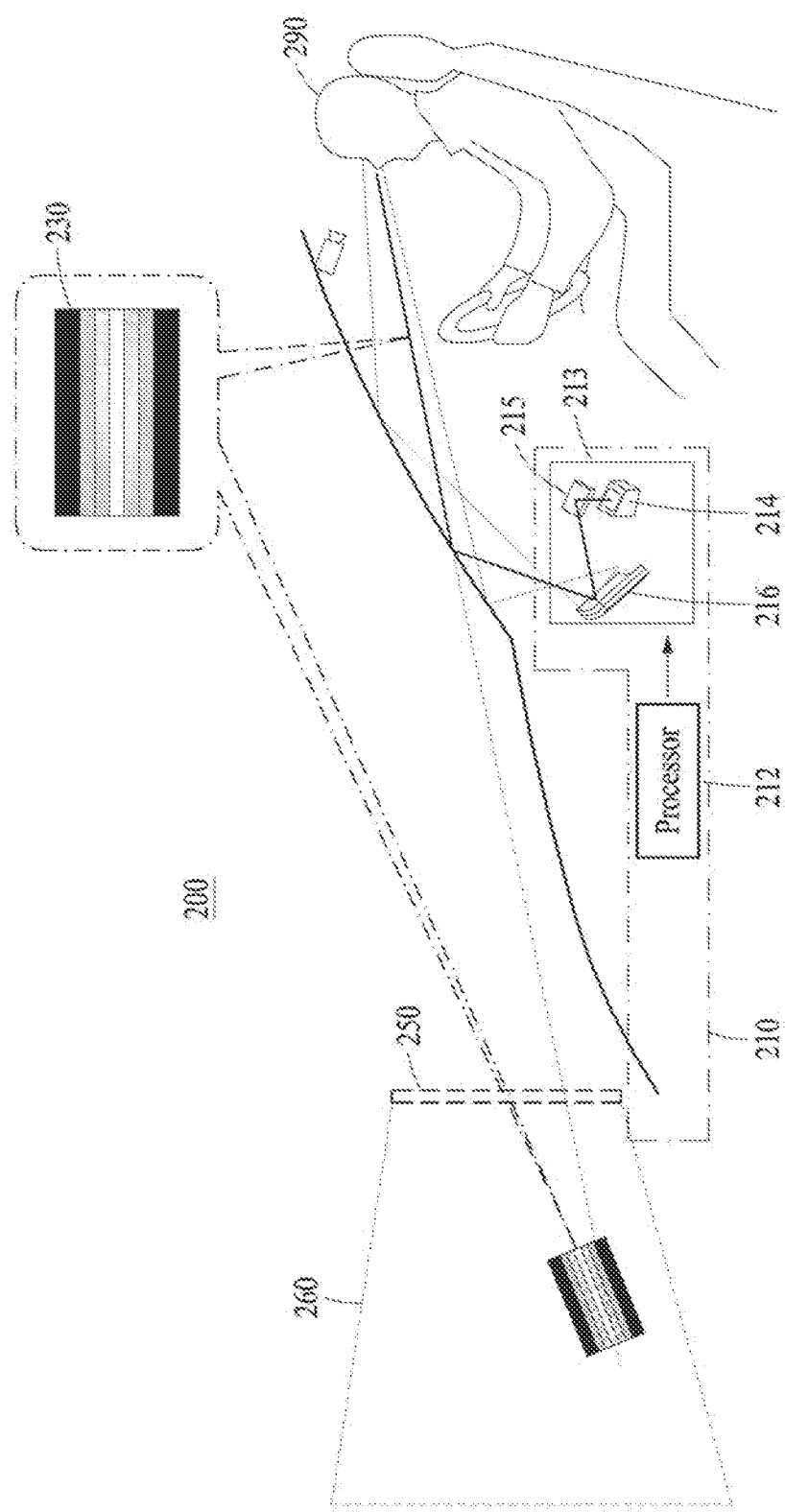
FIG. 2 illustrates an example in which an electronic device includes a head-up display (HUD) according to an example embodiment.

FIG. 2 illustrates an electronic device including a head-up display (HUD) according to an example embodiment.

A calibration system 200 may be a system that provides a user 290 with calibration of a parallax optical element, and may be, for example, a device including an electronic device 210 (e.g., the electronic device 100 of FIG. 1).

The electronic device 210 may include a processor 212 and a HUD 213. The electronic device 210 may also include an eye detector.

The processor 212 may provide a pattern image to the user 290 by outputting a rendered pattern image through the HUD 213. The processor 212 may re-render the pattern image based on a parameter adjusted according to an input of a user during calibration and may provide the re-rendered pattern image. After the calibration is completed, the processor 212 may render a content image using a fixed parameter and may provide the content image to the user. The content image may be, for example, information including content associated with driving, and information (hereinafter, driving information) associated with driving of a vehicle may include, for example, route guidance information and driving related information.

The HUD 213 may visualize a stereoscopic image in a visible region of the user 290 that is positioned in front of the user 290. For example, the HUD 213 may visualize a pattern image on a window (e.g., a windshield of a vehicle) disposed in front of the user 290. The HUD 213 may form a virtual projection plane 250. The projection plane 250 may be a plane on which a virtual image including a pattern generated by the HUD 213 is displayed. The user 290 may recognize the virtual image as being disposed on the projection plane 250. For example, due to an optical system by a windshield of a vehicle and of the HUD 213, a user may view an image 230 that represents a calibration pattern (e.g., an observed pattern) of a different type from an intended calibration pattern. The image 230 may represent a form in which the calibration pattern is further blurred in comparison to the intended calibration pattern or in which a gradation is added.

The HUD 213 may also visualize a content image having a depth on the projection plane 250. For example, the processor 212 may provide the user 290 with a content image including a left image and a right image with binocular disparity corresponding to a depth at which an object may be visualized, using the HUD 213. The HUD 213 may visualize content having a corresponding depth in a virtual region 260 on the projection plane 250. In an example, the processor 212 may render content to be a three dimensional (3D) graphic representation based on an optical system of the HUD 213. The 3D graphic representation may express a stereoscopic graphic representation having a depth. The HUD 213 may form a content image including a left image and a right image on the projection plane 250 based on a depth of the content. Through the projection plane 250, the left image may be provided to the left eye of the user 290 and the right image may be provided to the right eye of the user 290. For example, one virtual image may be formed on the projection plane 250, but may be separated into light corresponding to the left image and light corresponding to the right image by the optical system of the HUD 213 and the windshield, so that the left image and the right image may be directed to the left eye and the right eye of the user 290, respectively. Thus, the user 290 may recognize a sense of depth of stereoscopically rendered content.

The HUD 213 may include, for example, a picture generator 214, a fold mirror 215, and a concave mirror 216. The picture generator 214 may include a display (e.g., a display panel) and a parallax optical element. The parallax optical element may include, for example, a lenticular lens and a parallax barrier. However, the configuration of the HUD 213 is not limited thereto, and various components forming the projection plane 250 on which a virtual image is formed through projection toward a glass window disposed in front of the user 290 may be included depending on a design.

Although an example in which the electronic device 210 is mounted on a vehicle is mainly described herein, embodiments are not limited thereto. For example, the electronic device 210 may be applied to technology that combines information of a real world and information of a virtual world, such as, for example, augmented reality (AR) glasses or mixed reality (MR), and may also be applied to a vehicle, such as, for example, a motorcycle, an airplane, or a train.

In an example, the electronic device 210 may continue to express a depth by adjusting a depth of content, without changing a position of the projection plane 250 formed by the HUD 213. Since the position of the projection plane 250 does not need to be changed, the electronic device 210 may not require a physical control for components included in the HUD 213.

Figure 3:
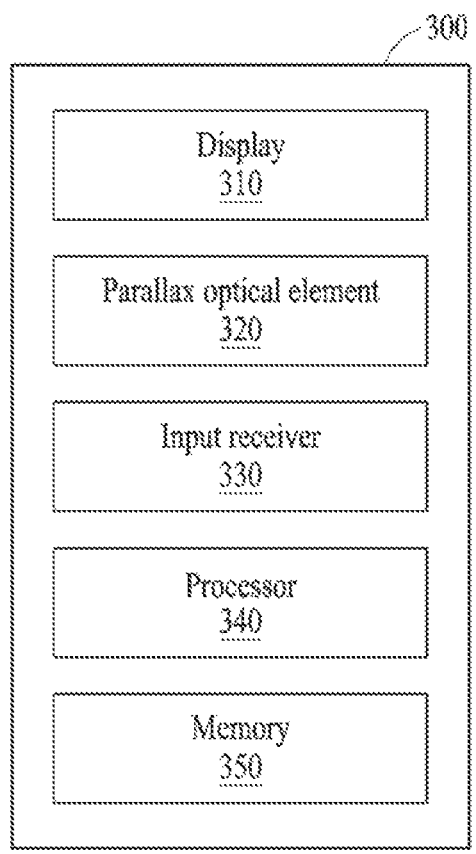
FIG. 3 is a block diagram of an electronic device according to an example embodiment.

FIG. 3 is a block diagram of an electronic device according to an example embodiment.

The electronic device 300 according to an example embodiment may include a display 310, a parallax optical element 320, an input receiver or interface 330, a processor 340, and a memory 350. The electronic device 300 may also include an eye detector.

The display 310 may visualize and output a pattern image and/or a content image. For example, the display 310 may output an image rendered by the processor 340 of the electronic device 300. The processor 340 may generate a pattern image by rendering a calibration pattern using parameters of the parallax optical element 320, and may generate a content image by rendering content. The display 310 may output a rendered pattern image and/or a rendered content image. Each of the pattern image and the content image may be an image in which images (e.g., a left image and a right image) corresponding to a plurality of viewpoints are mixed. The display 310 may generate light corresponding to an output image through a backlight unit and/or self-light emission, and may transmit the light to the parallax optical element 320 that will be described below. For example, the display 310 may be implemented as at least a portion of a HUD mounted on a vehicle, such as, for example, a motorcycle, an automobile, a train, a watercraft, an aircraft, and a spacecraft.

The parallax optical element 320 may provide light corresponding to the image output from the display 310 to a plurality of viewpoints. The parallax optical element 320 may be an optical element that is disposed on one surface (e.g., a front surface or a rear surface) of the display 310 and that is configured to direct light corresponding to an image output to the display 310 toward a plurality of viewpoints. For example, the parallax optical element 320 may direct light passing through a portion of the image output to the display 310 corresponding to a left image in an optical path to a left eye of a user. Similarly, the parallax optical element 320 may direct light passing through a portion of the image output to the display 310 corresponding to a right image in an optical path to a right eye of the user. The parallax optical element 320 may include an optical layer, for example, a parallax barrier, a lenticular lens array, or a directional backlight unit.

For example, the picture generator 214 of FIG. 2 may include the display 310 and the parallax optical element 320. However, although the HUD 213 is mainly an example to provide a stereoscopic image through a windshield in a vehicle as described in FIG. 2, embodiments are not limited thereto. The fold mirror 215 and the concave mirror 216 of the HUD 213 may magnify light corresponding to an image generated by a display 310 and the parallax optical element 320, and may provide the light to a user, and an optical system for magnifying an image may also change according to an application. For example, a mirror may be omitted depending on a design of a HUD, and mirrors may not be necessary in a flat panel display, for example, a television (TV). For convenience of description, description of the above-described optical system (e.g., a fold mirror and a concave mirror) for magnification of an image is omitted, and an optical path of light directed to an eye (e.g., a left eye) of a user by the display 310 and the parallax optical element 320 (e.g., a lenticular lens disposed in front of the display 310, or a directional backlight unit disposed behind the display 310) disposed in front of or behind the display 310 will be described with reference to FIGS. 3 to 13. For example, a lenticular lens may be laminated on one surface of a display panel. However, embodiments are not limited thereto, and optical elements (e.g., mirrors) configured to form a virtual image plane may be further included as necessary according to an application.

Through a combination of the display 310 and the parallax optical element 320 described above, the electronic device 300 may provide a left image and a right image to the left eye and the right eye of the user, respectively. The electronic device 300 may visualize content with a depth and provide the content as a stereoscopic graphic object to a user, by separating a graphic object with visualized content in a left image and a graphic object with visualized content in a right image from each other based on binocular disparity.

The input receiver 330 may receive an input of a user. For example, the input receiver 330 may receive an input for calibration of the parallax optical element 320 from a user who observes a pattern image from a reference viewpoint among a plurality of viewpoints. The input receiver 330 may include, for example, at least one or a combination of two or more of a touch panel, a touch screen, a dial, a jog dial, a shuttle dial, a click wheel, a button, a slider bar, and a control lever. The touch panel may sense a touch input from a user. The touch screen may sense a touch input from a user while displaying a screen. The touch input may be an input in which a contact is formed between an object (e.g., a finger and a pen) of a user and a touch panel and/or a touch screen. The dial may sense a clockwise or counterclockwise rotation control of a dial knob from a user. The shuttle dial may be a dial to which an outer ring of a dial knob is rotatably coupled, and may sense a clockwise or counterclockwise rotation control of the outer ring. The jog dial may be a dial in which an inner upper surface of the dial knob is rotatably coupled, and may sense a clockwise or counterclockwise rotation control of the inner upper surface. The click wheel may be a ring-shaped touch sense interface and may detect whether a touch point moves while rotating in a clockwise direction or a counterclockwise direction based on a central point of a ring shape. The button may sense a pressing control of a user, and may include, for example, an increase (e.g., "+") button and a decrease (e.g., "−") button. The slider bar may be implemented as a physically slidable lever or a touch screen that outputs a slidable graphic object. The control lever may be switched in at least one direction, for example, switched upward or downward, or leftward or rightward.

According to example embodiments, a pattern image may be an image representing a pattern (hereinafter, referred to as a "calibration pattern") for calibration, and may indicate an image in which one or more source images including the calibration pattern are rendered using parameters of a parallax optical element. An example of the calibration pattern and an example of the pattern image will be described below with reference to FIGS. 4 and 5.

The processor 340 may output a pattern image generated by rendering the calibration pattern toward a reference viewpoint. The processor 340 may adjust at least one or a combination of two or more of a pitch parameter, a slanted angle parameter, and a position offset parameter of the parallax optical element 320 in response to an input. The processor 340 may output the pattern image changed by re-rendering the calibration pattern according to the adjusted parameter, through the display 310. An operation of the processor 340 is not limited to those described above, and will be further described with reference to FIGS. 4 to 14. Each parameter of the parallax optical element 320 will be described below with reference to FIG. 6.

The memory 350 may temporarily or permanently store information used for calibration. For example, the memory 350 may store instructions to be executed by the processor 340 to perform operations according to FIGS. 4 to 14 that will be described below. The memory 350 may also store calibrated parameters (e.g., a pitch parameter, a slanted angle parameter, and a position offset parameter).

An eye detector may detect a position of an eye (e.g., a left eye and/or a right eye) of a user. The electronic device 300 may provide an image to a plurality of viewpoints through the display 310 and the parallax optical element 320, and may provide a pattern image for calibration to a reference viewpoint among the plurality of viewpoints. The electronic device 300 may detect a position of a reference eye (e.g., a left eye) between both eyes of a user through the above-described eye detector, and may determine a position corresponding to the reference eye as a reference viewpoint. The eye detector may include a camera capable of capturing an interior of a vehicle in the example of FIG. 2. The eye detector may detect an eye position from an image that is acquired by capturing the interior of the vehicle and that includes a user (e.g., a driver). However, embodiments are not limited thereto, and the processor 340 of the electronic device 300 may receive an internal image captured by an internal camera, and may detect and/or track a position of an eye of a user from the received internal image.

Figure 4:
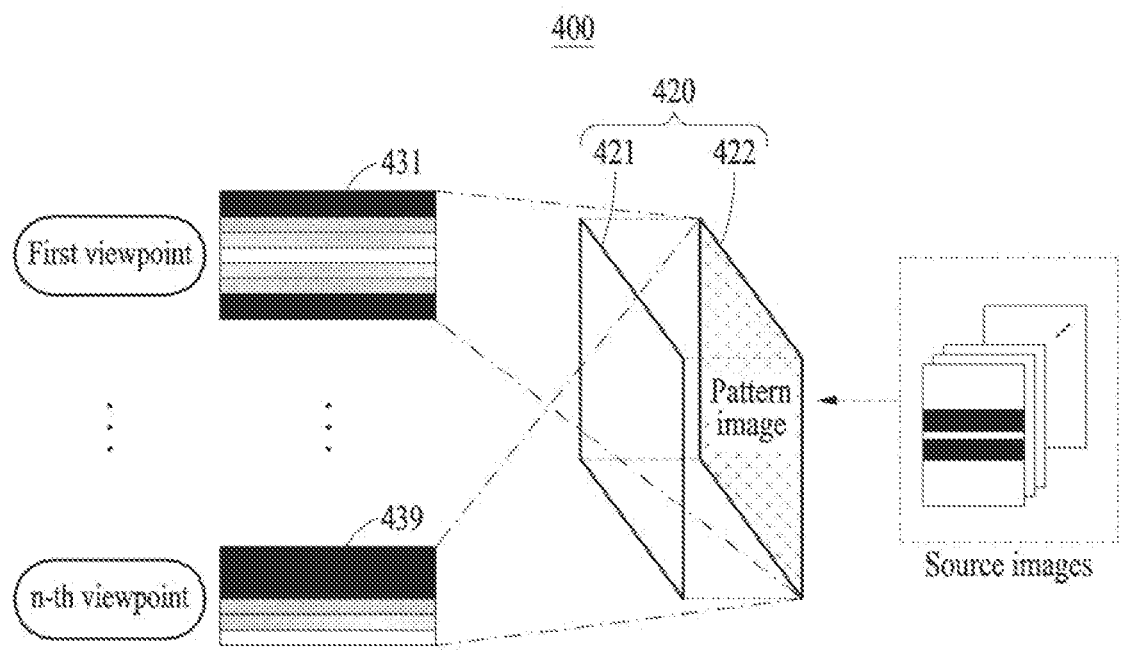
FIG. 4 illustrates source images, a pattern image, and observed images for calibration of a parallax optical element according to an example embodiment.

FIG. 4 illustrates source images, a pattern image, and observed images for calibration of a parallax optical element according to an example embodiment.

A calibration system 400 may include an electronic device 420. The electronic device 420 may include a parallax optical element 421 (e.g., the parallax optical element 320 of FIG. 3) and a display panel 422 (e.g., the display 310 of FIG. 3).

The electronic device 420 may generate a pattern image based on source images. The source images may be stored in the electronic device 420 or may be provided to the electronic device 420 by another device external to the electronic device 420. The source images may each correspond to a viewpoint. For example, n source images may individually correspond to a first viewpoint to an n-th viewpoint. In this example, n may be an integer greater than or equal to 2. In the example embodiments, an example in which n is set to 2 is mainly described, however, embodiments are not limited thereto. When an image is provided to viewpoints respectively corresponding to both eyes of a user, n may be 2. The electronic device 420 may generate a pattern image based on parameters so that an image corresponding to a reference viewpoint among a plurality of viewpoints corresponding to the source images may be observed from the reference viewpoint, which will be further described below. The reference viewpoint may be, for example, a viewpoint corresponding to a left eye of the user. The user may perform a calibration procedure while observing the pattern image only with the left eye with his or her right eye shut during calibration.

The electronic device 420 may display the pattern image through the display panel 422. The pattern image may be understood as a panel image that is generated based on source images including linear patterns and that represents a calibration pattern. For example, calibration patterns may be separately represented in the pattern image, and portions obtained by dividing the pattern image by individual viewpoints may be combined through a parallax optical element so that the calibration patterns may be observed. In observed images 431 to 439 of FIG. 4, calibration patterns are shown as blurred horizontal lines with a thickness, but embodiments are not limited thereto. For example, the calibration patterns may be blurred vertical lines having a thickness. A calibration pattern with a horizontal line or a calibration pattern with a vertical line may be used according to types of parameters, which will be further described below.

A calibration pattern may be a pattern in which patterns (e.g., linear patterns) included in one or more source images are combined. For example, the calibration pattern may be a pattern in which some of patterns of source images corresponding to viewpoints other than the reference viewpoint are combined based on a pattern of a source image corresponding to the reference viewpoint. The calibration pattern may include the entire pattern of the source image corresponding to the reference viewpoint, and a portion of a pattern of a source image corresponding to a viewpoint (e.g., an (i−1)-th viewpoint and an (i+1)-th viewpoint) adjacent to the reference viewpoint (e.g., an i-th viewpoint). In the calibration pattern, a number of patterns of source images corresponding to viewpoints (e.g., the first viewpoint and the n-th viewpoint) distant from the reference viewpoint may be less than a number of patterns of source images corresponding to viewpoints adjacent to the reference viewpoint. A human eye may clearly recognize an object based on a focus and recognize a blurred surrounding area, and a calibration pattern set based on an eyebox corresponding to the human eye may be a pattern in which linear patterns of source images corresponding to respective viewpoints are combined by simulating the above-described phenomenon. Accordingly, as described above, in the images 431 to 439 observed from viewpoints, a linear pattern corresponding to the reference viewpoint may be relatively clearly represented, and linear patterns corresponding to a neighboring viewpoint and a distant viewpoint may be relatively blurredly represented.

The parallax optical element 421 may convert the pattern image into a 3D image using an autostereoscopic scheme. The parallax optical element 421 may include an optical layer, for example, a parallax barrier, a lenticular lens array, or a directional backlight unit. Although the parallax optical element 421, for example of a lenticular lens array and a parallax barrier, is located in front of the display panel 422, as shown in FIG. 4, the parallax optical element 421 may also be located behind the display panel 422, such as, for example, a directional backlight unit.

The parallax optical element 421 may assign directivity to light that is provided to the display panel 422 or that is output from the display panel 422. Different images may be radiated to a plurality of viewpoints (e.g., viewpoints corresponding to both eyes of a viewer) through directional light, and a viewer may feel a three-dimensional effect. When different images are not accurately radiated to both eyes of a user in the autostereoscopic scheme, crosstalk may occur in a 3D image. For example, when an error occurs between a design value and an actual value of a parameter of the electronic device 420 during a production process or an installation process of the electronic device 420, crosstalk may occur.

For example, an image corresponding to a first pattern image generated by rendering one or more source images including a first source image may be observed from a first viewpoint, and an image corresponding to an n-th pattern image generated by rendering one or more source images including an n-th source image may be observed from an n-th viewpoint. The image 431, that is, a first observed image may be an image observed when light corresponding to the first pattern image arrives at the first viewpoint by passing through the parallax optical element 421. The image 439, that is, an n-th observed image may be an image observed when light corresponding to the n-th pattern image arrives at the n-th viewpoint by passing through the parallax optical element 421. A pattern image corresponding to one viewpoint (e.g., a reference viewpoint) may be displayed on portions of the display panel 422 through which light directed to the viewpoint passes. For example, in a pattern image, a calibration pattern may be divided and represented on portions of the display panel 422 through which light directed to the reference viewpoint passes. Light corresponding to portions obtained by dividing the calibration pattern may be combined at the reference point while passing through the parallax optical element 421, and thus a user may observe the calibration pattern from the reference viewpoint.

According to an example embodiment, the electronic device 420 may detect a position of a reference eye of a user. For example, the electronic device 420 may detect a position of an eye of a user, through a separate camera installed in the electronic device 420 or around and adjacent to the electronic device 420. The electronic device 420 may perform rendering so that the pattern image may be observed from a reference viewpoint corresponding to the detected position of the eye.

Figure 5:
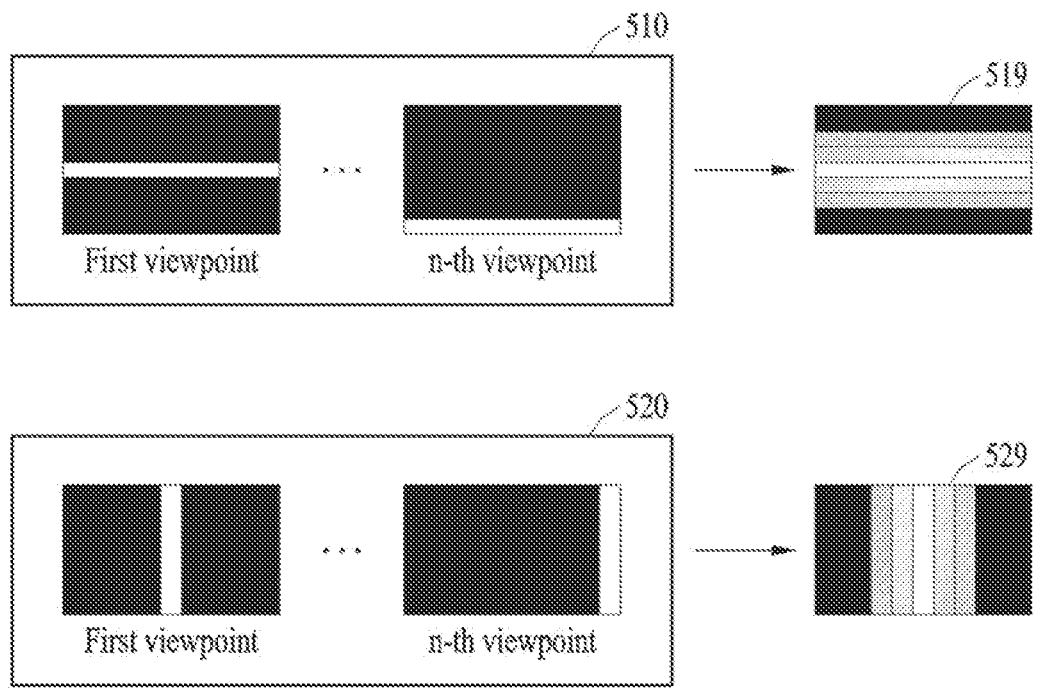
FIG. 5 illustrates a source image and an observed image according to an example embodiment.

FIG. 5 illustrates a source image and an observed image according to an example embodiment.

First source images 510 and second source images 520 may correspond to a plurality of viewpoints, for example, a first viewpoint to an n-th viewpoint. Each of the first source images 510 may include a linear pattern with a horizontal line at a different position based on a corresponding viewpoint. Each of the second source images 520 may include a linear pattern with a vertical line at a different position based on a corresponding viewpoint. The first source images 510 may be used to generate a first pattern image, and the second source images 520 may be used to generate a second pattern image. In an example, an electronic device may render one or more source images including a first source image corresponding to an i-th viewpoint for calibration at the i-th viewpoint, using parameters of a parallax optical element, to generate a first pattern image corresponding to the i-th viewpoint. In this example, i denotes an integer greater than or equal to 1 and less than or equal to n. In another example, the electronic device may render one or more source images including a second source image corresponding to the i-th viewpoint, using parameters of the parallax optical element, to generate a second pattern image corresponding to the i-th viewpoint.

For example, during calibration of an individual parameter among a plurality of parameters, a calibration pattern that facilitates determination of whether a corresponding parameter is calibrated may be present. The first source images 510 may be black in areas other than the horizontal line. The second source images 520 may be black in areas other than the vertical line. The first source images 510 may be used to facilitate calibration of a pitch parameter, and the second source images 520 may be used to facilitate calibration of a slanted angle parameter. Among the source images, a linear pattern of a source image corresponding to a reference viewpoint may be changed to a color (e.g., green) different from a color (e.g., white) of a linear pattern of another viewpoint.

The electronic device (e.g., the electronic device 300 of FIG. 3) may generate a pattern image through light field rendering so that a source image corresponding to the reference viewpoint may be represented at the reference viewpoint. In FIG. 5, an example in which the first viewpoint is used as a reference viewpoint and a pattern image is rendered at the first viewpoint will be described. When it is assumed that the pattern image is output in a state in which parameter calibration is completed, a user may view a first observed image 519 and a second observed image 529 from the reference viewpoint. For example, in an ideal environment, the first observed image 519 and the second observed image 529 may need to have the same pattern as a calibration pattern in which source images are combined corresponding to the reference viewpoint. However, in an actual environment where crosstalk is present, a gradation may be further added to a calibration pattern corresponding to the reference viewpoint or the calibration pattern may be further blurred in each of the first observed image 519 and the second observed image 529. For reference, an example of rendering using parameters that are completely calibrated is described above with reference to FIG. 5. In the first observed image 519, a calibration pattern with a horizontal line (e.g., a blurred horizontal line having a thickness) may be observed, and in the second observed image 529, a calibration pattern with a vertical line (e.g., a blurred vertical line having a thickness) may be observed. Before calibration is completed, each linear calibration pattern may be observed as an oblique linear pattern rather than a vertical line or a horizontal line. Parameters for an alignment of the above-described calibration pattern will be described below with reference to FIG. 6.

Figure 6:
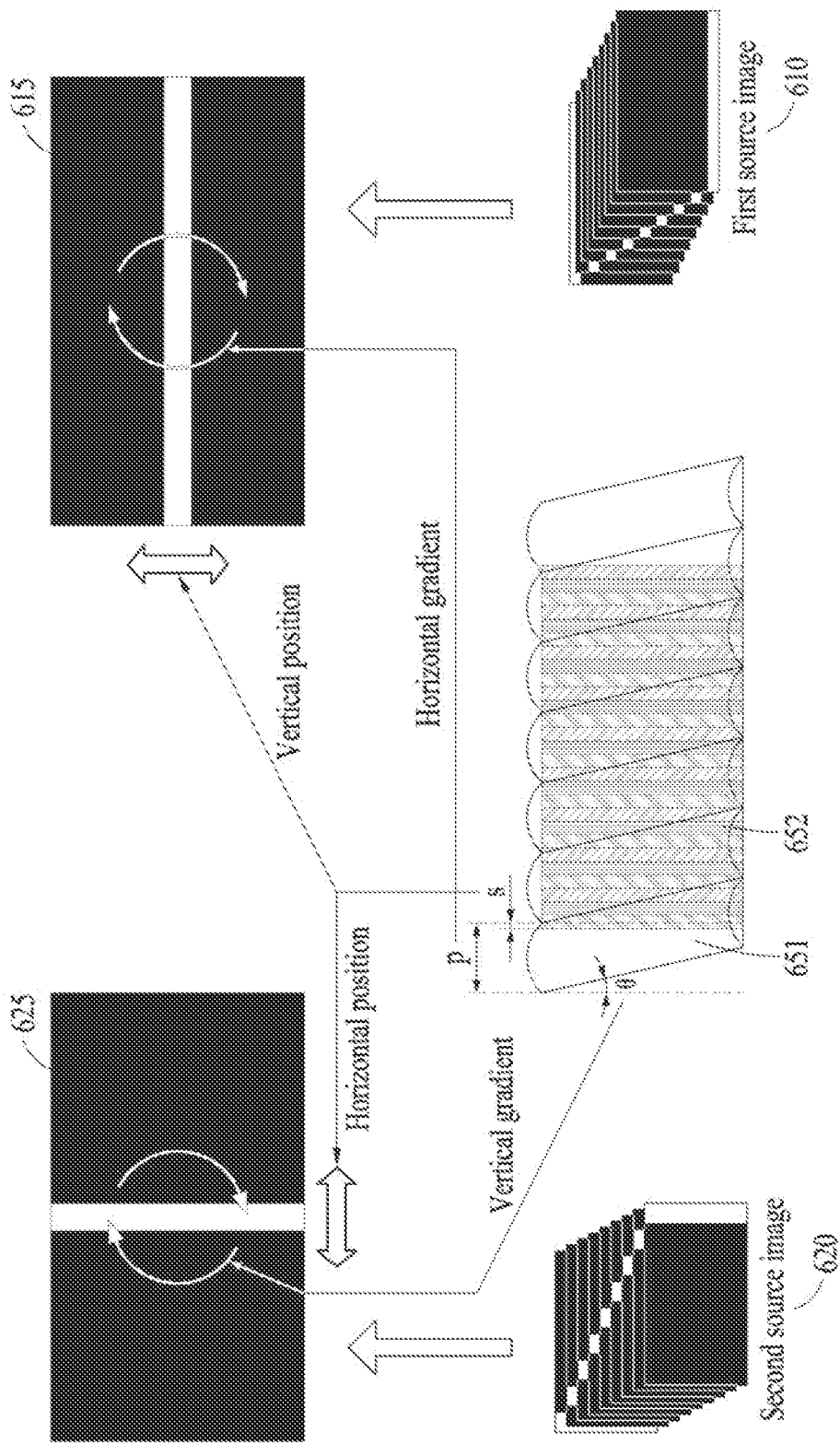
FIG. 6 illustrates parameters of a parallax optical element according to an example embodiment.

FIG. 6 illustrates parameters of a parallax optical element according to an example embodiment.

A first observed image 615 based on a first source image 610 may be viewed by a user, and a second observed image 625 based on a second source image 620 may be obtained. For example, unlike the example of FIG. 5 in which crosstalk is present, the first observed image 615 and the second observed image 625 are observed in a state in which calibration has been completed and an ideal environment in which crosstalk is absent, for convenience as shown in FIG. 6.

A parameter of an electronic device (e.g., the electronic device 300 of FIG. 3) may also be referred to as a parameter of a parallax optical element 651 (e.g., the parallax optical element 320 of FIG. 3). Parameters of the parallax optical element 651 may include a pitch parameter, a slanted angle parameter, and a position offset parameter.

The pitch parameter may be a parameter indicating a pitch p of a unit element of the parallax optical element 651. The parallax optical element 651 may include unit elements. A unit element is a unit optical element that assigns a directivity to light corresponding to an image output through a display 652, and may include, for example, a slit of a parallax barrier and a unit lens of lenticular lenses. The unit elements may be periodically arranged along one axis on a plane corresponding to an optical layer disposed on one surface of the display 652. The pitch parameter may indicate an interval of a periodic arrangement of unit elements. In FIG. 6, the pitch parameter may indicate a horizontal period of the unit element. A length of an interval in which a view is iterated in a 3D image may be determined based on a pitch p. Using the pitch parameter, a gradient (e.g., a horizontal gradient) of a linear pattern in the first observed image 615 may be adjusted. For example, through adjustment of the pitch parameter, a linear calibration pattern corresponding to a pattern image may be rotated.

The slanted angle parameter may indicate a gradient of a unit element of the parallax optical element 651 relative to a reference axis of the display 652. In FIG. 6, the reference axis of the display 652 is illustrated as a vertical axis, and a slanted angle θ may indicate a gradient of a unit element formed with respect to the vertical axis. Using the slanted angle parameter, a gradient of a linear pattern in the second observed image 625 may be adjusted.

The position offset parameter may indicate a relative position between the parallax optical element 651 and the display 652. For example, the position offset parameter may indicate a position offset s between a start position of a unit element and a start pixel of the display 652. In FIG. 6, the position offset parameter is illustrated as a horizontal offset between start positions of left unit elements based on a start pixel of an upper left end of the display 652. Using the position offset parameter, the electronic device may adjust a vertical position of the linear pattern in the first observed image 615 and a horizontal position of the linear pattern in the second observed image 625.

According to an example embodiment, a processor of the electronic device may be configured to provide a user with at least one or a combination of two or more of a first pattern image corresponding to a pitch parameter, a second pattern image corresponding to a slanted angle parameter, and a third pattern image corresponding to a position offset parameter. The first pattern image may be generated based on first source images each including a horizontal line. The second pattern image may be generated based on second source images each including a vertical line. The third pattern image may be generated as a calibration pattern including one of a vertical line and a horizontal line. As further discussed below, the pitch parameter may be calibrated independently of other parameters based on a horizontal pattern. When the pitch parameter is calibrated, the slanted angle parameter may also be calibrated independently of other parameters based on a vertical pattern. The electronic device may simultaneously provide two or more of the first pattern image, the second pattern image, and the third pattern image, or may sequentially provide the first pattern image, the second pattern image, and the third pattern image one by one.

According to various example embodiments, first calibration using the first pattern image and second calibration using the second pattern image may be sequentially performed. The electronic device may provide the second pattern image to the user when adjustment of the pitch parameter by providing the first pattern image is completed. The electronic device may provide the third pattern image to the user when adjustment of the slanted angle parameter by providing the second pattern image is completed. Since the adjustment of the pitch parameter has an influence on the slanted angle parameter, the pitch parameter may be adjusted before the adjustment of the slanted angle parameter.

In the first calibration, the user may observe the first pattern image displayed by the electronic device, and may perform a calibration input to adjust a first parameter set (e.g., a pitch parameter) of the electronic device based on the observed first pattern image. In the first calibration, the providing of the first pattern image and adjustment of the first parameter set may be repeated until corresponding calibration is completed by the user. In the second calibration, the user may observe the second pattern image displayed by the electronic device and may adjust a second parameter set (e.g., a slanted angle parameter) of the electronic device based on the observed second pattern image. In the second calibration, the providing of the second pattern image and adjustment of the second parameter set may be repeated until corresponding calibration is completed by the user. Similarly, third calibration for calibration of the position offset parameter may be performed.

A process of calibration performed using a sequence of a horizontal pattern and a vertical pattern may be efficiently performed at a low resolution in comparison to a calibration process using other complex patterns such as a check pattern. This is because, since horizontal pattern-based calibration and vertical pattern-based calibration are performed separately, complexity of a calibration task may be reduced. Autostereoscopic 3D image technology may be implemented in a low-resolution device such as a HUD. A HUD may have a relatively long viewing distance and a resolution that is insufficient for estimating a parameter using a single pattern image, in comparison to a general display device. Due to a catadioptric system included in the HUD, distortion may also occur in a 3D image. In an example, calibrations may be sequentially performed using simple patterns, and thus such a low-resolution device or a device including an optical system may exhibit high performance.

Figure 7:
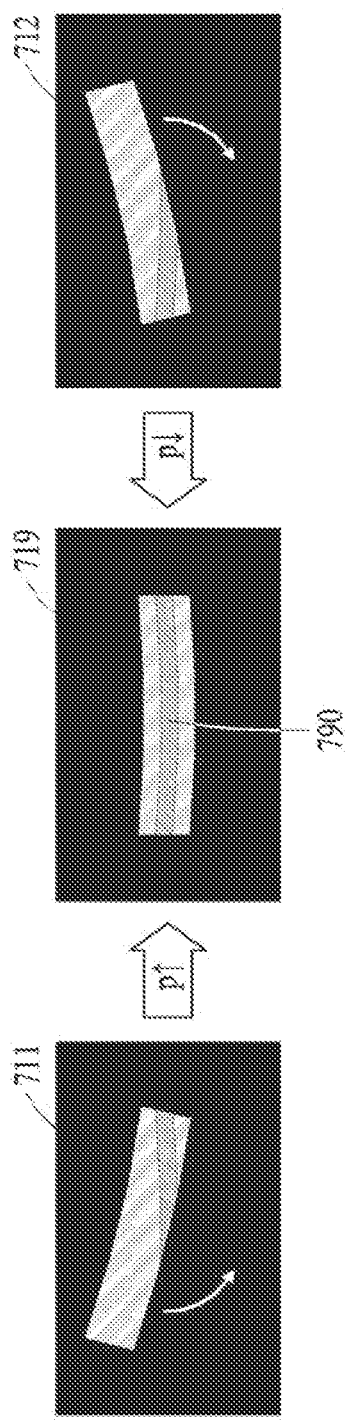
FIGS. 7, 8, and 9 illustrate examples of a change in a pattern image based on adjustment of parameters according to an example embodiment.
Figure 8:
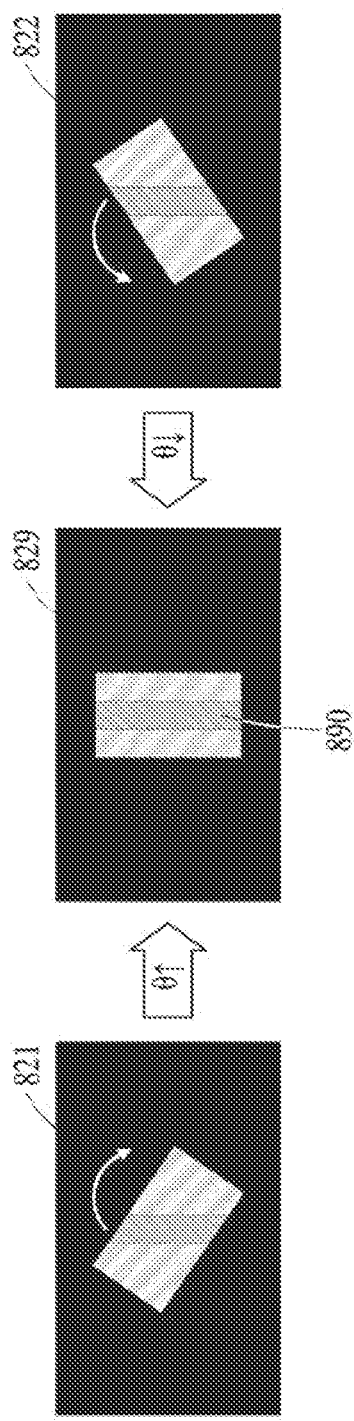
Figure 9:
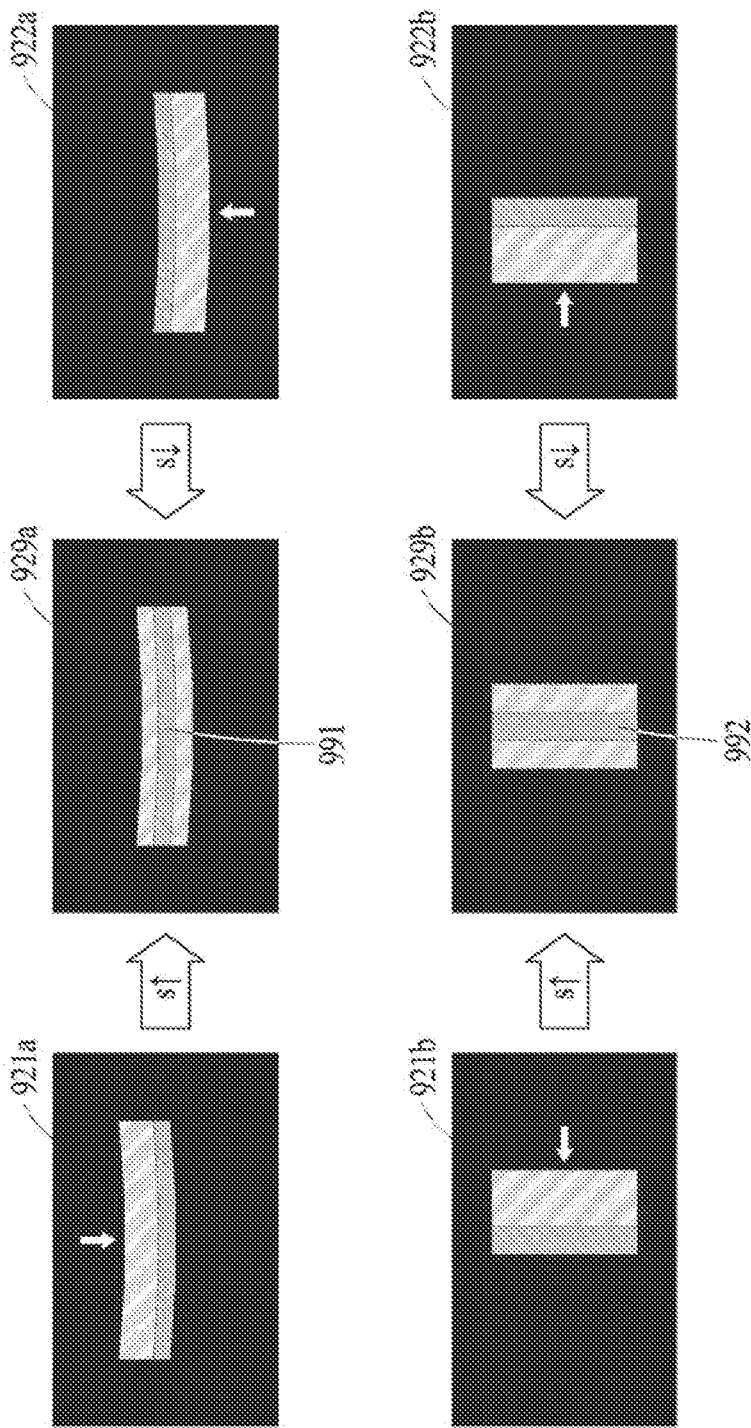

FIGS. 7, 8, and 9 illustrate examples of a change in a pattern image based on adjustment of parameters according to an example embodiment.

FIG. 7 illustrates a change in a pattern image according to adjustment of a pitch parameter.

For example, when calibration of the pitch parameter is not completed, a user may observe a calibration pattern in which an angle is not aligned in each of images 711 and 712 observed by the user. For example, a calibration pattern of a source image may be a linear pattern (e.g., a single horizontal line pattern having a thickness). A linear pattern represented in each of the images 711 and 712 observed by the user may be slightly slanted relative to a horizontal line and may have a thickness.

An electronic device may induce the user to adjust the pitch parameter so that a corresponding linear pattern may be horizontally represented. For example, the electronic device may provide the user with a calibration pattern together with a reference line 790. A linear pattern with a thickness may include at least a portion of the reference line 790. The reference line 790 may correspond to, for example, a horizontal line of a screen in FIG. 7. Due to crosstalk, the reference line 790 may be slightly curved. The reference line 790 may be partially covered in the images 711 and 712 as shown in FIG. 7, and accordingly the user may observe only a portion of the reference line 790. In a calibrated image 719, the entire reference line 790 may be represented.

According to an example embodiment, a processor may rotate a pattern corresponding to a first pattern image in a counterclockwise direction from a direction in which a user observes the pattern, in response to an increase in a value of a pitch parameter among parameters of a parallax optical element according to an input. For example, the electronic device may change a value of the pitch parameter of the parallax optical element to a value greater than a preset value in response to an input of the user, and may output a new first pattern image generated by re-rendering one or more source images including a first source image using the pitch parameter with the increased value. As shown in FIG. 7, when a set value of the pitch parameter increases, a pattern obtained by rotating a linear pattern of the image 711 corresponding to a previous first pattern image in the counterclockwise direction may be observed in the calibrated image 719 corresponding to the new first pattern image.

In addition, the processor may rotate the pattern corresponding to the first pattern image in a clockwise direction from the direction the user observes the pattern, in response to a decrease in the value of the pitch parameter among the parameters of the parallax optical element according to an input. For example, the electronic device may change the value of the pitch parameter of the parallax optical element to a value less than the pre-set value in response to an input of the user, and may output a new first pattern image generated by re-rendering one or more source images including the first source image using the pitch parameter with the reduced value. As shown in FIG. 7, when the set value of the pitch parameter decreases, a pattern obtained by rotating a linear pattern of the image 712 corresponding to a previous first pattern image in the clockwise direction may be observed in the calibrated image 719 corresponding to the new first pattern image.

For example, during rendering of view images (e.g., source images) corresponding to n (e.g., 17) viewpoints, the electronic device may visualize a linear pattern of a view image (e.g., an eighth view image) corresponding to an i-th viewpoint that is a reference viewpoint, with a reference color (e.g., green). The reference color may be a color distinguishable from a color of a linear pattern of another source image. The calibration pattern may be a pattern observed from one viewpoint (e.g., a reference viewpoint) in partial images obtained by dividing a panel image (e.g., a pattern image), which is generated by rendering view images corresponding to all the n viewpoints and which is output, into n equal portions. In the calibration pattern, the reference line 790 may represent a linear pattern of an intermediate view image (e.g., a view image corresponding to an eighth viewpoint in a central position among 17 viewpoints) among view images reaching a human eye at the reference viewpoint.

The reference line 790 may be fixed without rotation even though the calibration pattern is rotated, and covered portions of the reference line 790 may appear according to rotation of the calibration pattern. Through the above-described rotation of the calibration pattern, a covered portion of the reference line 790 may appear, and accordingly the calibration pattern may be aligned with the reference line 790. The processor may continue to receive a calibration input from the user until the calibration pattern (e.g., a linear pattern) is aligned with the reference line 790. For example, the user may adjust the pitch parameter so that the linear pattern may be parallel to the reference line 790 (e.g., a horizontal line). When a first calibration end input is received from the user, the processor may determine that the calibration of the pitch parameter is completed. For example, whether the calibration pattern and the reference line 790 are aligned may be determined by the user. However, the reference line 790 may not be necessarily presented, and the electronic device may be designed to receive, from the user, an input for adjustment of the pitch parameter to allow the linear pattern of the calibration pattern observed by the user to be horizontal during the calibration of the pitch parameter. For example, the user may adjust a calibration pattern corresponding to the first pattern image to be horizontal through visual estimation.

FIG. 8 illustrates a change in a pattern image according to adjustment of a slanted angle parameter.

For example, when calibration of the slanted angle parameter is not completed, a user may observe a calibration pattern in which an angle is not aligned in each of images 821 and 822 observed by the user. For example, a pattern of a source image may be a linear pattern (e.g., a single vertical line pattern having a thickness). A linear pattern represented in each of the images 821 and 822 observed by the user may be slightly slanted related to a vertical line and may have a thickness.

An electronic device may induce the user to adjust the slanted angle parameter so that a corresponding linear pattern may be vertically represented. For example, the electronic device may provide a calibration pattern including a reference line 890 to the user. A linear pattern with a thickness may include at least a portion of the reference line 890. The reference line 890 may correspond to, for example, a vertical line of a screen in FIG. 8. The reference line 890 may be partially covered in the images 821 and 822 as shown in FIG. 8, and accordingly the user may observe only a portion of the reference line 890. In a calibrated image 819, the entire reference line 890 may be represented.

According to an example embodiment, a processor may rotate a pattern corresponding to a second pattern image in a clockwise direction from a direction in which the user observes the pattern, in response to an increase in a value of the slanted angle parameter among parameters of a parallax optical element according to an input. For example, the electronic device may change the value of the slanted angle parameter of the parallax optical element to a value greater than a pre-set value in response to an input of the user, and may output a new second pattern image generated by re-rendering one or more source images including a second source image using the slanted angle parameter with the increased value. As shown in FIG. 8, when a set value of the slanted angle parameter increases, a pattern obtained by rotating a linear pattern of the image 821 corresponding to a previous second pattern image in the clockwise direction may be observed in a calibrated image 829 corresponding to the new second pattern image.

In addition, the processor may rotate the pattern corresponding to the second pattern image in a counterclockwise direction from the direction in which the user observes the pattern, in response to a decrease in the value of the slanted angle parameter among the parameters of the parallax optical element according to the input. For example, the electronic device may change the value of the slanted angle parameter of the parallax optical element to a value less than the pre-set value in response to an input of the user, and may output a new second pattern image generated by re-rendering one or more source images including the second source image using the slanted angle parameter with the reduced value. As shown in FIG. 8, when the set value of the slanted angle parameter decreases, a pattern obtained by rotating a linear pattern of the image 822 corresponding to a previous second pattern image in the counterclockwise direction may be observed in the calibrated image 829 corresponding to the new second pattern image.

The user may adjust the slanted angle parameter so that the linear pattern may be parallel to the reference line 890 (e.g., a vertical line). When a second calibration end input is received from the user, the processor may determine that the calibration of the slanted angle parameter is completed. For example, whether the calibration pattern and the reference line 890 are aligned may be determined by the user. However, the reference line 890 may not be necessarily presented, and the electronic device may be designed to receive, from the user, an input for adjustment of the slanted angle parameter to allow the linear pattern of the calibration pattern observed by the user to be vertical during the calibration of the slanted angle parameter. For example, the user may adjust a calibration pattern corresponding to the second pattern image to be vertical through visual estimation.

FIG. 9 illustrates a change in a pattern image according to adjustment of a position offset parameter.

For example, if calibration of the position offset parameter is not completed, a user may observe a calibration pattern in which a position is not aligned in each of images 921a, 922a, 921b, and 922b observed by the user. For example, a calibration pattern combined for a reference viewpoint may be a linear pattern (e.g., a single horizontal line pattern or a single vertical line pattern). For example, a third pattern image for the calibration of the position offset parameter may be rendered using one or more first source images or may be rendered using one or more second source images. When one of a vertical pattern and a horizontal pattern is aligned with the center, the other of the vertical pattern and the horizontal pattern may also be aligned with the center, and accordingly the position offset parameter may be adjusted using one of the vertical pattern and the horizontal pattern. For reference, the position offset parameter may not have an influence on a gradient of the linear pattern. The position offset parameter may be adjusted independently of the pitch parameter and the slanted angle parameter.

According to an example embodiment, a processor may move a pattern corresponding to the third pattern image in one direction from a direction in which the user observes the pattern, in response to an increase in a value of the position offset parameter among parameters of the parallax optical element according to an input. In an example, when the pattern corresponding to the third pattern image is a horizontal pattern and when the value of the position offset parameter increases, an electronic device may provide a calibrated image 929a by moving a pattern of the image 921a in a first direction (e.g., a downward direction). In another example, when the pattern corresponding to the third pattern image is a vertical pattern and when the value of the position offset parameter increases, the electronic device may provide a calibrated image 929b by moving a pattern of the image 921b in a third direction (e.g., a direction from the right to the left).

In addition, the processor may move the pattern corresponding to the third pattern image in an opposite direction to the one direction from the direction in which the user observes the pattern, in response to a decrease in the value of the position offset parameter among the parameters of the parallax optical element according to an input. In an example, when the pattern corresponding to the third pattern image is a horizontal pattern and when the value of the position offset parameter decreases, the electronic device may provide the calibrated image 929a by moving a pattern of the image 922a in a second direction (e.g., an upward direction) opposite to the first direction. In another example, when the pattern corresponding to the third pattern image is a vertical pattern and when the value of the position offset parameter decreases, the electronic device may provide the calibrated image 929b by moving a pattern of the image 922b in a fourth direction (e.g., a direction from the left to the right) opposite to the second direction.

Through the above-described adjustment of the position offset parameter, the electronic device may change the position of the calibration pattern so that reference lines 991 and 992 may be located at a central portion of the calibration pattern. The user may adjust a calibration pattern corresponding to the third pattern image to be located in a central portion (e.g., a position corresponding to a reference line) of a range (e.g., a field of view) in which the calibration pattern corresponding to the third pattern image is observed, through visual estimation.

Figure 10:
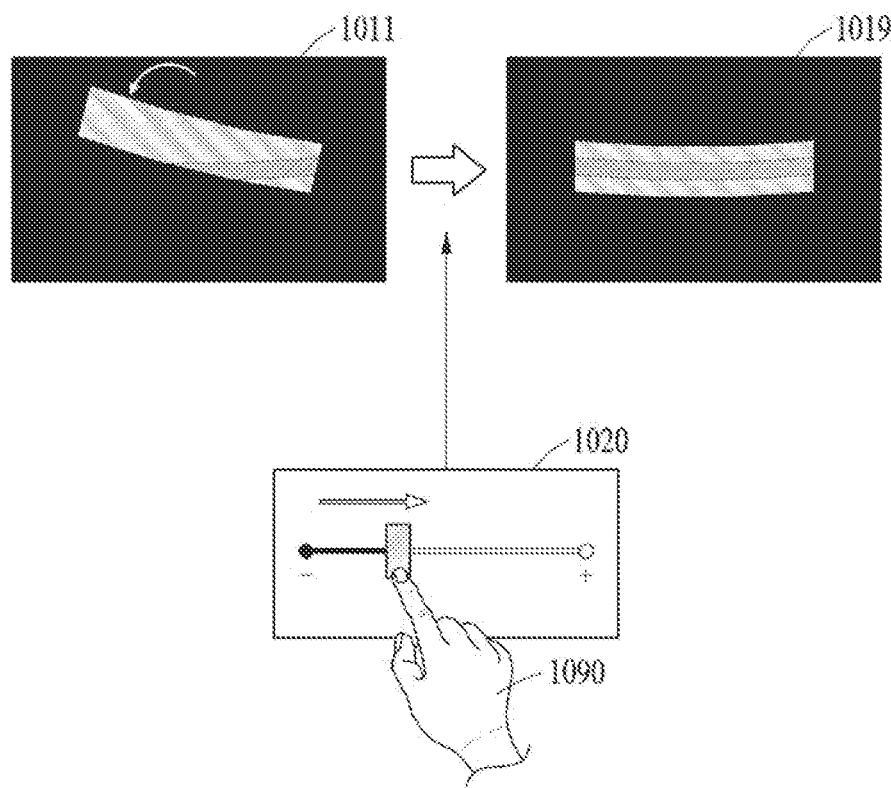
FIG. 10 illustrates parameter adjustment using a slider bar according to an example embodiment.

FIG. 10 illustrates parameter adjustment using a slider bar according to an example embodiment.

According to an example embodiment, an electronic device may output and display a slider bar interface 1020 through a touch screen. The electronic device may receive a touch control to move a slider bar object on the touch screen from a user 1090. In an example, when the slider bar object moves in one direction (e.g., a direction from left to right) in response to an input of the user 1090, the electronic device may increase a value of a parameter. In another example, when the slider bar object moves in another direction (e.g., a direction from right to left) in response to an input of the user 1090, the electronic device may reduce the value of the parameter. In FIG. 10, an example of calibration of a pitch parameter is illustrated. The electronic device may increase a value of the pitch parameter when the slider bar object is moved in one direction. For example, when a movement of the slider bar object in one direction is detected, the electronic device may provide a calibrated image 1019 to the user 1090 by rotating a pattern of an observed image 1011 in a counterclockwise direction.

Figure 11:
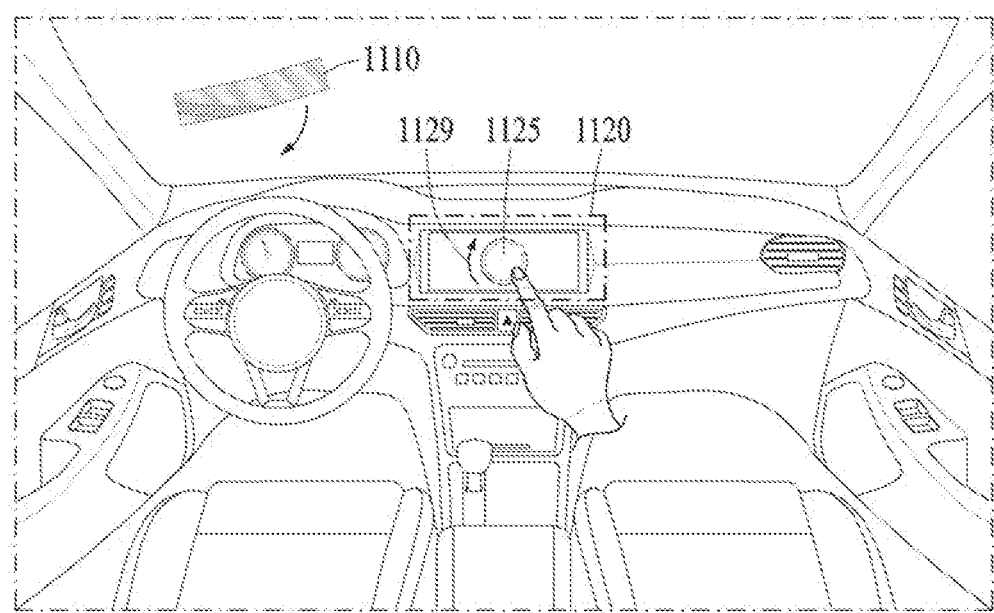
FIG. 11 illustrates parameter adjustment using a touch interface according to an example embodiment.

FIG. 11 illustrates parameter adjustment using a touch interface according to an example embodiment.

According to an example embodiment, a processor may map adjustment of at least one of a pitch parameter and a slanted angle parameter to an input module capable of detecting a rotation control 1129 in an input receiver. For example, the input receiver may detect the rotation control 1129 from a user. The input receiver may include a plurality of input modules or devices, and an electronic device may select an input module configured to detect the rotation control 1129 from the plurality of input modules. When the rotation control 1129 by the user is detected by the input receiver during calibration of the parallax optical element, the processor may adjust at least one of a pitch parameter and a slanted angle parameter among parameters of a parallax optical element. The electronic device may adjust the pitch parameter and/or the slanted angle parameter through a touch interface (e.g., a touch panel and a touch screen 1120) and/or a physical control interface (e.g., a rotary dial) configured to detect the rotation control 1129. In FIG. 11, an example of detecting the rotation control 1129 through the touch screen 1120 is illustrated.

The input receiver may include the touch screen 1120. The processor may output and display on the touch screen 1120, a first graphic representation 1125 for guiding the rotation control 1129 during calibration of at least one of the pitch parameter and the slanted angle parameter. For example, in FIG. 11, the electronic device may output a circular first graphic representation 1125 that guides the rotation control 1129 to the touch screen 1120. When a movement of a touch point along at least partially circular trajectory from a point on the touch screen 1120 is detected corresponding to the first graphic representation 1125, the processor may adjust at least one of the pitch parameter and the slanted angle parameter.

For example, when the touch point moves along a circular trajectory in a clockwise direction from a central point of the circular trajectory, the electronic device may rotate an observed calibration pattern 1110 in the clockwise direction. When the touch point is rotated in the clockwise direction during calibration of the pitch parameter, the electronic device may reduce a value of the pitch parameter. When the touch point is rotated in the clockwise direction during calibration of the slanted angle parameter, the electronic device may increase a value of the slanted angle parameter. When the touch point moves in a counterclockwise direction, the electronic device may increase the value of the pitch parameter and/or reduce the value of the slanted angle parameter.

However, embodiments are not limited to supporting detection of the rotation control 1129 in the touch interface. The processor may map adjustment of the position offset parameter to an input module or device capable of detecting a linear control in the input receiver. The input receiver may include a plurality of input modules, and the electronic device may select an input module capable of detecting a linear control (e.g., a linear manipulation) from the plurality of input modules. For example, the processor may output, to the touch screen 1120, a second graphic representation for guiding a linear control during calibration of the position offset parameter. The processor may output the slider bar interface 1020 of FIG. 10 as a second graphic representation through the touch screen 1120 during calibration of the position offset parameter. When a linear movement of the touch point from one point on the touch screen 1120 to another point is detected corresponding to the second graphic representation, the processor may adjust the position offset parameter. For example, the processor may increase a value of the position offset parameter when the second graphic representation is moved in one direction, and may reduce the value of the position offset parameter when the second graphic representation is moved in another direction. When a movement of the second graphic representation in one direction is detected, the electronic device may linearly move the calibration pattern 1110 in the one direction. Similarly, when a movement of the second graphic representation in another direction is detected, the electronic device may linearly move the calibration pattern 1110 in the other direction.

Although the rotation control and the linear control in the touch interface have been described above with reference to FIG. 11, embodiments are not limited thereto. An example of mapping between a physical control interface and parameter adjustment will be described below with reference to FIG. 12.

Figure 12:
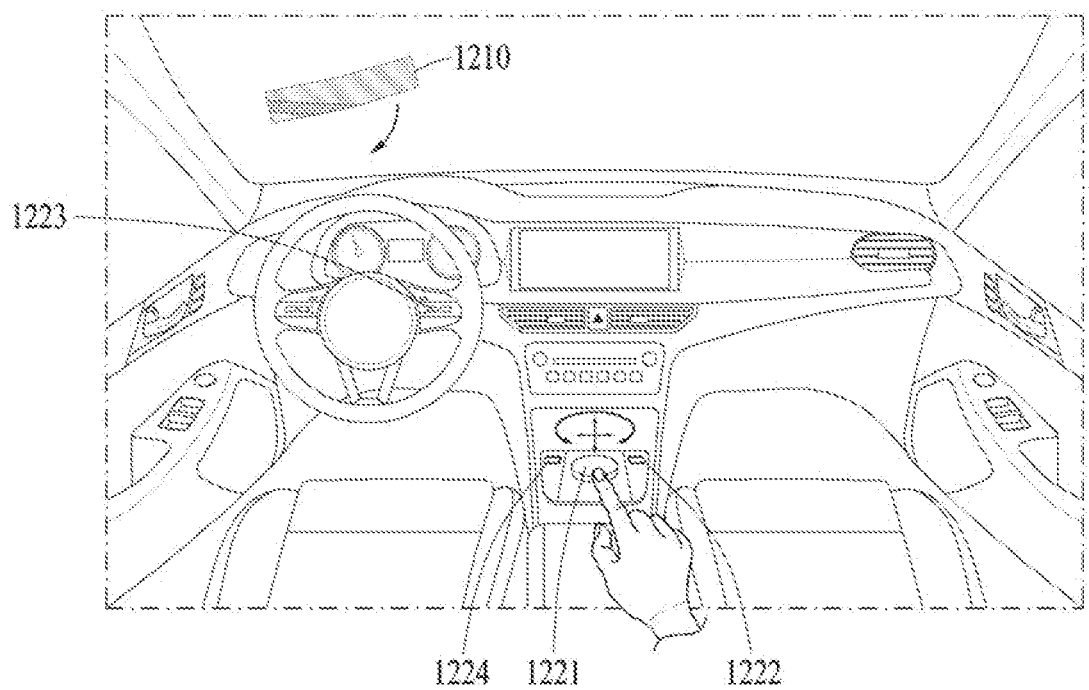
FIG. 12 illustrates parameter adjustment using a dial interface according to an example embodiment.

FIG. 12 illustrates parameter adjustment using a dial interface according to an example embodiment.

According to an example embodiment, an input receiver of an electronic device may include a dial interface 1221. The dial interface 1221 may include a dial knob that is coupled to the electronic device to be rotated in a clockwise direction or a counterclockwise direction. In addition, the dial knob may be coupled to the electronic device to move along one axis. For example, the dial interface 1221 may detect both a rotation control and a linear control.

In an example, when a counterclockwise rotation control is detected by the input receiver while a first pattern image corresponding to a pitch parameter is being provided, a processor may rotate a calibration pattern 1210 corresponding to the first pattern image in a counterclockwise direction. When the counterclockwise rotation control is detected by the input receiver while the first pattern image corresponding to the pitch parameter is being provided, the processor may increase a value of the pitch parameter. When a counterclockwise rotation of the dial knob in the dial interface 1221 is detected, the electronic device may rotate the calibration pattern 1210 in the counterclockwise direction by increasing the value of the pitch parameter as described above.

In another example, when a clockwise rotation control is detected by the input receiver while the first pattern image corresponding to the pitch parameter is being provided, the processor may rotate the calibration pattern 1210 corresponding to the first pattern image in a clockwise direction. When the clockwise rotation control is detected by the input receiver while the first pattern image corresponding to the pitch parameter is being provided, the processor may reduce the value of the pitch parameter. When a clockwise rotation of the dial knob in the dial interface 1221 is detected, the electronic device may rotate the calibration pattern 1210 in the clockwise direction by reducing the value of the pitch parameter as described above.

Thus, the electronic device may match a rotation control direction (e.g., a rotation direction of the dial knob) to a rotation direction of the calibration pattern 1210 during adjustment of the pitch parameter. The electronic device may provide a more intuitive and user-friendly calibration control to a user. For example, if an error occurs in a parameter due to an internal factor or an external factor, a user who owns a vehicle may more easily and manually calibrate a parameter of a parallax optical element through the above-described control. Thus, the user may minimize an external service support for calibration of the parameter of the parallax optical element.

In an example, when a clockwise rotation control is detected by the input receiver while a second pattern image corresponding to a slanted angle parameter is being provided, the processor may rotate a calibration pattern 1210 corresponding to the second pattern image in the clockwise direction. When the clockwise rotation control is detected by the input receiver while the second pattern image corresponding to the slanted angle parameter is being provided, the processor may increase a value of the slanted angle parameter. When a clockwise rotation of the dial knob in the dial receiver 1221 is detected during calibration of the slanted angle parameter, the electronic device may rotate the calibration pattern 1210 in the clockwise direction by increasing the value of the slanted angle parameter as described above.

In another example, when a counterclockwise rotation control is detected by the input receiver while the second pattern image corresponding to the slanted angle parameter is being provided, the processor may rotate the calibration pattern 1210 corresponding to the second pattern image in the counterclockwise direction. When the counterclockwise rotation control is detected by the input receiver while the second pattern image corresponding to the slanted angle parameter is being provided, the processor may reduce the value of the slanted angle parameter. When a counterclockwise rotation of the dial knob in the dial receiver 1221 is detected during the calibration of the slanted angle parameter, the electronic device may rotate the calibration pattern 1210 in the counterclockwise direction by reducing the value of the slanted angle parameter as described above.

Thus, the electronic device may match a rotation control direction (e.g., a rotation direction of the dial knob) to a rotation direction of the calibration pattern 1210 during adjustment of the slanted angle parameter. The electronic device may provide a more intuitive calibration control to a user. For example, an increase and a decrease in the value of the slanted angle parameter according to the rotation control direction in adjustment of the slanted angle parameter, and an increase and a decrease in the value of the pitch parameter according to the rotation control direction in adjustment of the pitch parameter may be opposite to each other. For example, in response to a clockwise control, the value of the pitch parameter may decrease and the value of the slanted angle parameter may increase. In response to a counterclockwise control, the value of the pitch parameter may increase and the value of the slanted angle parameter may decrease.

In an example, when a linear control in one direction is detected by the input receiver while a third pattern image corresponding to a position offset parameter is being provided, the processor may move a calibration pattern 1210 corresponding to third first pattern image in the one direction. When the linear control in the one direction is detected by the input receiver while the third pattern image corresponding to the position offset parameter is being provided, the processor may increase a value of the position offset parameter. When a movement of the dial knob in the dial receiver 1221 in one direction (e.g., a direction from a front side to a rear side) is detected, the electronic device may move the calibration pattern 1210 in a corresponding direction (e.g., a direction from top to bottom) by increasing the value of the position offset parameter.

In another example, when a linear control in an opposite direction to the one direction is detected by the input receiver while the third pattern image corresponding to the position offset parameter is being provided, the processor may move the calibration pattern 1210 corresponding to the third pattern image in the opposite direction to the one direction. When the linear control in the opposite direction to the one direction is detected by the input receiver while the third pattern image corresponding to the position offset parameter is being provided, the processor may reduce the value of the position offset parameter. When a movement of the dial knob in the dial receiver 1221 in another direction (e.g., a direction from the rear side to the front side) is detected, the electronic device may move the calibration pattern 1210 in a direction (e.g., a direction from bottom to top) corresponding to the other direction by reducing the value of the position offset parameter.

Thus, the electronic device may match a linear control direction (e.g., a movement direction of the dial knob) to a linear movement direction of the calibration pattern 1210 when the position offset parameter is adjusted. Thus, the electronic device may provide a more intuitive calibration control to a user.

Although the dial interface 1221 including the dial knob has been mainly described with reference to FIG. 12, embodiments are not limited thereto. The electronic device may receive an input for calibration through a button 1223 attached to a steering wheel of a vehicle, and various levers and/or buttons 1222 and 1224 disposed on a center fascia.

Figure 13:
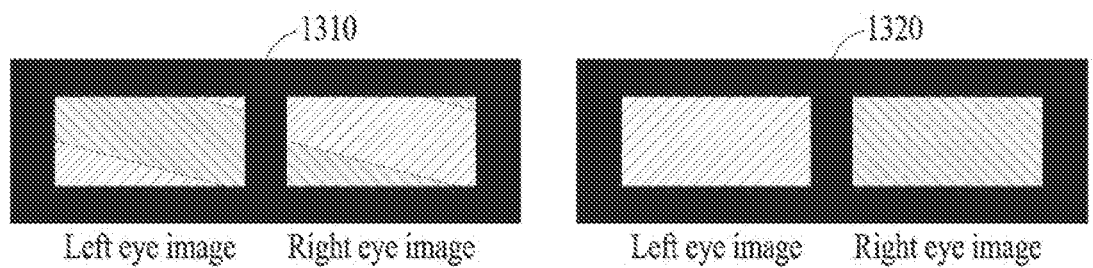
FIG. 13 illustrates a calibration result according to an example embodiment.

FIG. 13 illustrates a calibration result according to an example embodiment.

Before calibration of a parallax optical element is completed, a left eye image and a right eye image may include a portion of content of the right eye image and a portion of content of the left eye image, respectively, as indicated by reference numeral 1310. According to an example embodiment, when the calibration of the parallax optical element is completed, the content of the left eye image and the content of the right eye image may be displayed separately from each other, as indicated by reference numeral 1320. For example, crosstalk may be eliminated.

According to an example embodiment, when a calibration completion input is received from a user, a processor may store parameters of the parallax optical element that are personalized to the user. An electronic device may render a content image using the personalized parameters and output the content image to a display. Through feedback of an interface and a calibration pattern as described above in FIGS. 4 to 12, a user may intuitively and manually adjust the parameters of the parallax optical element with convenience.

Figure 14:
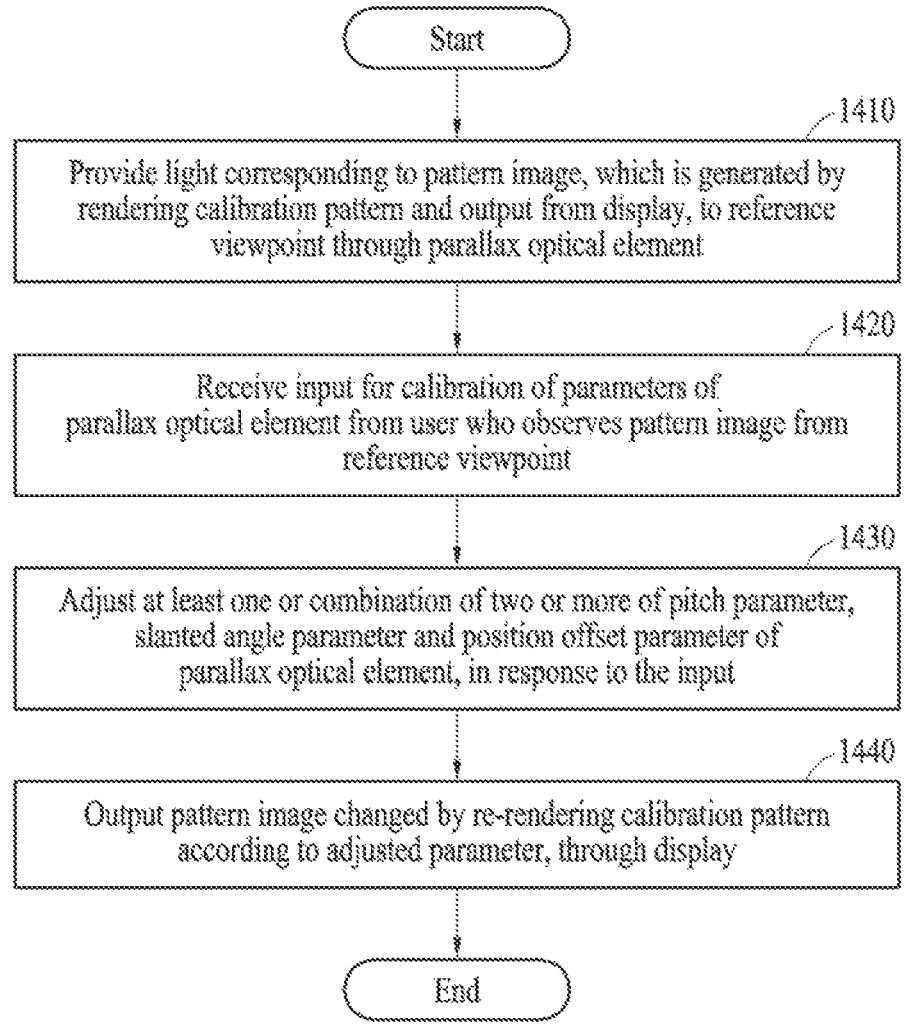
FIG. 14 is a flowchart illustrating a calibration method according to an example embodiment.

FIG. 14 is a flowchart illustrating a calibration method according to an example embodiment.

In operation 1410, an electronic device may provide light corresponding to a pattern image, which is generated by rendering a calibration pattern and output from a display, to a reference viewpoint, using a parallax optical element In operation 1420, the electronic device may receive an input for calibration of parameters of the parallax optical element from a user who observes the pattern image from the reference viewpoint.

In operation 1430, the electronic device may adjust at least one or a combination of two or more of a pitch parameter, a slanted angle parameter, and a position offset parameter of the parallax optical element, in response to the input.

In operation 1440, the electronic device may output the pattern image changed by re-rendering the calibration pattern according to an adjusted parameter, through the display.

However, operations of the electronic device are not limited to those described with reference to FIG. 14 and may be performed along with at least one of the operations described above with reference to FIGS. 1 to 13 in time-series manner or in parallel.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
   a display to output an image;
   a parallax optical element configured to provide light corresponding to the image to a plurality of viewpoints;
   an input interface configured to receive an input to calibrate the parallax optical element from a user who observes a pattern image from a reference viewpoint among the plurality of viewpoints; and
   a processor configured to:
   output the pattern image generated by rendering a calibration pattern toward the reference viewpoint;
   adjust at least one of a pitch parameter, a slanted angle parameter, and a position offset parameter of the parallax optical element based on the input; and
   output the pattern image adjusted by re-rendering the calibration pattern based on an adjusted parameter,
   wherein the processor is further configured to:
   rotate a first calibration pattern corresponding to a first pattern image corresponding to the pitch parameter in a counterclockwise direction, based on a counterclockwise rotation control being detected by the input interface while the first pattern image is being provided; and rotate the first calibration pattern corresponding to the first pattern image in a clockwise direction, based on a clockwise rotation control being detected by the input interface while the first pattern image is being provided.

2. The electronic device of claim 1, wherein the processor is further configured to:

rotate a pattern corresponding to the first pattern image in the counterclockwise direction from a direction in which the user observes the pattern, based on an increase in a value of the pitch parameter among parameters of the parallax optical element based on the input; and rotate the pattern corresponding to the first pattern image in the clockwise direction from the direction in which the user observes the pattern, based on a decrease in the value of the pitch parameter among the parameters of the parallax optical element based on the input.

3. The electronic device of claim 1, wherein the processor is further configured to:

rotate a pattern corresponding to a second pattern image in the clockwise direction from a direction in which the user observes the pattern, based on an increase in a value of the slanted angle parameter among parameters of the parallax optical element based on the input; and rotate the pattern corresponding to the second pattern image in the counterclockwise direction from the direction in which the user observes the pattern, based on a decrease in the value of the slanted angle parameter among the parameters of the parallax optical element based on the input.

4. The electronic device of claim 1, wherein the processor is further configured to:

move a pattern corresponding to a third pattern image in one direction from a direction in which the user observes the pattern, based on an increase in a value of the position offset parameter among parameters of the parallax optical element based on the input; and move the pattern corresponding to the third pattern image in an opposite direction to the one direction from the direction in which the user observes the pattern, based on a decrease in the value of the position offset parameter among the parameters of the parallax optical element based on the input.

5. The electronic device of claim 1, wherein the input interface comprises at least one of a touch panel, a touch screen, a dial, a jog dial, a shuttle dial, a click wheel, a button, a slider bar, and a control lever.

6. The electronic device of claim 1, wherein the processor is further configured to:

map adjust at least one of the pitch parameter and the slanted angle parameter to an input device configured to detect a rotation control in the input interface; and map adjust the position offset parameter to the input device further configured to detect a linear control in the input interface.

7. The electronic device of claim 1, wherein the input interface is configured to detect a rotation control input by the user, and wherein the processor is further configured to adjust at least one of the pitch parameter and the slanted angle parameter among parameters of the parallax optical element, based on the rotation control input by the user being detected by the input interface during calibration of the parallax optical element.

8. The electronic device of claim 1, wherein the processor is further configured to:

increase a value of the pitch parameter, based on the counterclockwise rotation control being detected by the input interface while the first pattern image is being provided; and reduce the value of the pitch parameter, based on the clockwise rotation control being detected by the input interface while the first pattern image is being provided.

9. An electronic device comprising:

a display to output an image;

a parallax optical element configured to provide light corresponding to the image to a plurality of viewpoints;

an input interface configured to receive an input to calibrate the parallax optical element from a user who observes a pattern image from a reference viewpoint among the plurality of viewpoints; and a processor configured to:

output the pattern image generated by rendering a calibration pattern toward the reference viewpoint;

adjust at least one of a pitch parameter, a slanted angle parameter, and a position offset parameter of the parallax optical element based on the input; and output the pattern image adjusted by re-rendering the calibration pattern based on an adjusted parameter, wherein the processor is further configured to:

rotate a second calibration pattern corresponding to a second pattern image corresponding to the slanted angle parameter in a clockwise direction, based on a clockwise rotation control being detected by the input interface while the second pattern image is being provided; and rotate the second calibration pattern corresponding to the second pattern image in a counterclockwise direction, based on a counterclockwise rotation control being detected by the input interface while the second pattern image is being provided.

10. The electronic device of claim 9, wherein the processor is further configured to:

increase a value of the slanted angle parameter, based on the clockwise rotation control being detected by the input interface while the second pattern image is being provided; and reduce the value of the slanted angle parameter, based on the counterclockwise rotation control being detected by the input interface while the second pattern image is being provided.

11. An electronic device comprising:

a display to output an image;

a parallax optical element configured to provide light corresponding to the image to a plurality of viewpoints;

an input interface configured to receive an input to calibrate the parallax optical element from a user who observes a pattern image from a reference viewpoint among the plurality of viewpoints; and a processor configured to:

output the pattern image generated by rendering a calibration pattern toward the reference viewpoint;

adjust at least one of a pitch parameter, a slanted angle parameter, and a position offset parameter of the parallax optical element based on the input; and output the pattern image adjusted by re-rendering the calibration pattern based on an adjusted parameter, wherein the processor is further configured to:

move a third calibration pattern corresponding to a third pattern image corresponding to the position offset parameter in a first direction, based on a linear control in the first direction being detected by the input interface while the third pattern image is being provided; and move the third calibration pattern corresponding to the third pattern image in a second direction that is opposite to the first direction, based on a linear control in the second direction to the first direction being detected by the input interface while the third pattern image is being provided.

12. The electronic device of claim 11, wherein the processor is further configured to:

increase a value of the position offset parameter, based on the linear control in the first direction being detected by the input interface while the third pattern image corresponding to the position offset parameter is being provided; and reduce the value of the position offset parameter based on the linear control in the second direction opposite to the first direction being detected by the input interface while the third pattern image is being provided.

13. The electronic device of claim 1, wherein the input interface comprises a touch screen, and the processor is further configured to:

output, via the touch screen, a first graphic representation configured to guide a rotation control during calibration of at least one of the pitch parameter and the slanted angle parameter;

adjust at least one of the pitch parameter and the slanted angle parameter, based on a movement of a touch point along at least partially circular trajectory from a point on the touch screen being detected corresponding to the first graphic representation;

output, via the touch screen, a second graphic representation configured to guide a linear control during calibration of the position offset parameter; and adjust the position offset parameter, based on a linear movement of the touch point from one point on the touch screen to another point being detected corresponding to the second graphic representation.

14. The electronic device of claim 1, wherein the processor is further configured to:

store parameters of the parallax optical element that are personalized to the user, based on a calibration completion input being received from the user; and render a content image based on the personalized parameters and output, via the display, the content image.

15. The electronic device of claim 1, wherein the processor is further configured to provide the user with at least one of the first pattern image corresponding to the pitch parameter, a second pattern image corresponding to the slanted angle parameter, and a third pattern image corresponding to the position offset parameter.

16. The electronic device of claim 15, wherein the processor is further configured to:

provide the second pattern image to the user, based on adjustment of the pitch parameter by providing the first pattern image being completed; and provide the third pattern image to the user, based on adjustment of the slanted angle parameter by providing the second pattern image being completed.

17. The electronic device of claim 1, wherein the display is included in a head-up display (HUD) mounted on a vehicle, wherein the vehicle is one of a motorcycle, an automobile, a train, a watercraft, an aircraft, and a spacecraft.

18. A method implemented by a processor, the method comprising:

providing light corresponding to a pattern image to a reference viewpoint through a parallax optical element, the pattern image being generated by rendering a calibration pattern and output from a display;

receiving an input to calibrate parameters of the parallax optical element from a user who observes the pattern image from the reference viewpoint;

adjusting at least one of a pitch parameter, a slanted angle parameter, and a position offset parameter of the parallax optical element, based on the input; and outputting the pattern image adjusted by re-rendering the calibration pattern based on an adjusted parameter, by the display the outputting the pattern image comprising:

rotating a first calibration pattern corresponding to a first pattern image corresponding to the pitch parameter in a counterclockwise direction, based on a counterclockwise rotation control being detected by an input interface while the first pattern image is being provided; and rotating the first calibration pattern corresponding to the first pattern image in a clockwise direction, based on a clockwise rotation control being detected by the input interface while the first pattern image is being provided.

19. A non-transitory computer-readable storage medium storing instructions that, when executed by the processor, cause the processor to perform the method of claim 18.

* * * * *